US012547927B2

(12) United States Patent
Chow et al.

(10) Patent No.: US 12,547,927 B2
(45) Date of Patent: Feb. 10, 2026

(54) DETECTING ASSOCIATED EVENTS

(71) Applicant: Oracle International Corporation, Redwood Shores, CA (US)

(72) Inventors: Simon Chow, San Francisco, CA (US); Ricardo Alfonso Barona Castellanos, Guadalajara (MX); Everardo Lopez Sandoval, Guadalajara (MX)

(73) Assignee: Oracle International Corporation, Redwood Shores, CA (US)

( * ) Notice: Subject to any disclaimer, the term of this patent is extended or adjusted under 35 U.S.C. 154(b) by 999 days.

(21) Appl. No.: 17/185,045

(22) Filed: Feb. 25, 2021

(65) Prior Publication Data
US 2022/0180247 A1   Jun. 9, 2022

Related U.S. Application Data

(60) Provisional application No. 63/121,578, filed on Dec. 4, 2020.

(51) Int. Cl.
*G06N 20/00* (2019.01)
*G06F 16/245* (2019.01)

(52) U.S. Cl.
CPC .......... *G06N 20/00* (2019.01); *G06F 16/245* (2019.01)

(58) Field of Classification Search
CPC .............................. G06N 20/00; G06F 16/245
See application file for complete search history.

(56) References Cited

U.S. PATENT DOCUMENTS

| 8,332,018 | B2* | 12/2012 | Ebert ............... G16H 40/67 600/509 |
| 9,306,962 | B1* | 4/2016 | Pinto ............... H04L 63/1416 |
| 10,127,129 | B2* | 11/2018 | Parkinson ............ H04L 41/064 |
| 11,509,136 | B2* | 11/2022 | Visweswariah ........ H02J 3/001 |
| 2007/0266142 | A1* | 11/2007 | Nastacio ............ G06F 11/0709 709/224 |
| 2012/0066163 | A1* | 3/2012 | Balls ............... G16B 40/00 435/6.12 |

(Continued)

OTHER PUBLICATIONS

Gainaru, Ana, et al. "Adaptive event prediction strategy with dynamic time window for large-scale hpc systems." Managing Large-scale Systems via the Analysis of System Logs and the Application of Machine Learning Techniques. 2011. 1-8. (Year: 2011).*

(Continued)

*Primary Examiner* — Andrew T Chiusano
(74) *Attorney, Agent, or Firm* — Invoke (57) ABSTRACT

Techniques are disclosed for identifying related events. In some cases, a first event triggers an analysis in which subsequent events within a time window are analyzed. A duration of a time window may be based on one or more attributes of a triggering event. Events subsequent to the triggering event are analyzed to determine if any of the subsequent events are related to or otherwise associated with the triggering event. The system determines a duration of the time window based on attributes associated with the triggering event. Basing the duration of the time window on attributes associated with the triggering event enables the system to search for related subsequent events within a time period within which any related events are likely to occur.

19 Claims, 5 Drawing Sheets

(56) References Cited

U.S. PATENT DOCUMENTS

| | | | | |
|---|---|---|---|---|
| 2012/0185264 | A1* | 7/2012 | Demogenes | G16H 20/10 |
| | | | | 705/2 |
| 2017/0359306 | A1* | 12/2017 | Thomas | G06F 21/52 |
| 2018/0005127 | A1* | 1/2018 | Akyamac | H04L 41/5025 |
| 2018/0075235 | A1* | 3/2018 | Tajima | G06F 21/554 |
| 2018/0349606 | A1* | 12/2018 | Zhang | G06N 20/00 |
| 2019/0065739 | A1* | 2/2019 | Manadhata | H04L 63/1425 |
| 2019/0068627 | A1* | 2/2019 | Thampy | H04L 63/1425 |
| 2019/0273789 | A1* | 9/2019 | Modarresi | G06N 20/00 |
| 2020/0039521 | A1* | 2/2020 | Misu | G06N 3/042 |
| 2020/0244639 | A1* | 7/2020 | Arif Khan | G06N 20/10 |
| 2021/0092141 | A1* | 3/2021 | Gamble | H04L 63/1433 |
| 2022/0092028 | A1* | 3/2022 | Layton | G06F 16/284 |

OTHER PUBLICATIONS

Sheng, Zhang, et al. "An adaptive time window method for human activity recognition." 2015 IEEE 28th Canadian conference on electrical and computer engineering (CCECE). IEEE, 2015. (Year: 2015).*

Zhang, Xinghui, Lei Xiao, and Jianshe Kang. "Degradation prediction model based on a neural network with dynamic windows." Sensors 15.3 (2015): 6996-7015. (Year: 2015).*

* cited by examiner

DETECTING ASSOCIATED EVENTS

INCORPORATION BY REFERENCE; DISCLAIMER

This application is hereby incorporated by reference: application no. 63/121,678 filed on Dec. 4, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to the automatic detection of events. In particular, the present disclosure relates to detecting events that are related to or associated with one another.

BACKGROUND

Automatically identifying transactions that are associated with one another may improve the efficiency of a variety of applications. For example, pairing request with associated actions may help automate workflows, track tasks, maintain focus on needed tasks, and direct efforts to those tasks needing attention. However, identifying requests and tasks across many users is computationally expensive and often does not scale well to larger user populations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. IDENTIFYING RELATED EVENTS WITHIN AN ANALYSIS WINDOW
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

In some examples, systems identify an event that triggers an analysis in which subsequent events within a time window are analyzed. The subsequent events are analyzed to determine if any of the subsequent events are related to or otherwise associated with the triggering event. The system determines a duration of the time window based on attributes associated with the triggering event. Basing the duration of the time window on attributes associated with the triggering event enables the system to search for related subsequent events within a time period within which any related events are likely to occur.

For example, a system may identify a first event having a first set of attributes. Based on the first set of attributes, the system generates a first time window having a first duration in which candidate events may be detected. These candidate events may be analyzed to determine whether one or more of the candidate events, such as a second event, occurring within the first time window are related to the first event. The system may analyze a second set of attributes associated with the second event to determine if the first event and the second event are related. This process may be repeated for any number of triggering events. For example, the system may use the attributes of a third event to determine a second duration for a second time window. The system may then analyze a second set of candidate events to determine whether any of the candidate events in the second set, such as a fourth event, are related to the third event. The system generates durations of time windows for subsequently detected triggering events that are based on the attributes for the corresponding triggering event.

One or more embodiments described in this Specification and/or recited in the claims may not be included in this General Overview section.

2. System Architecture

Figure 1:
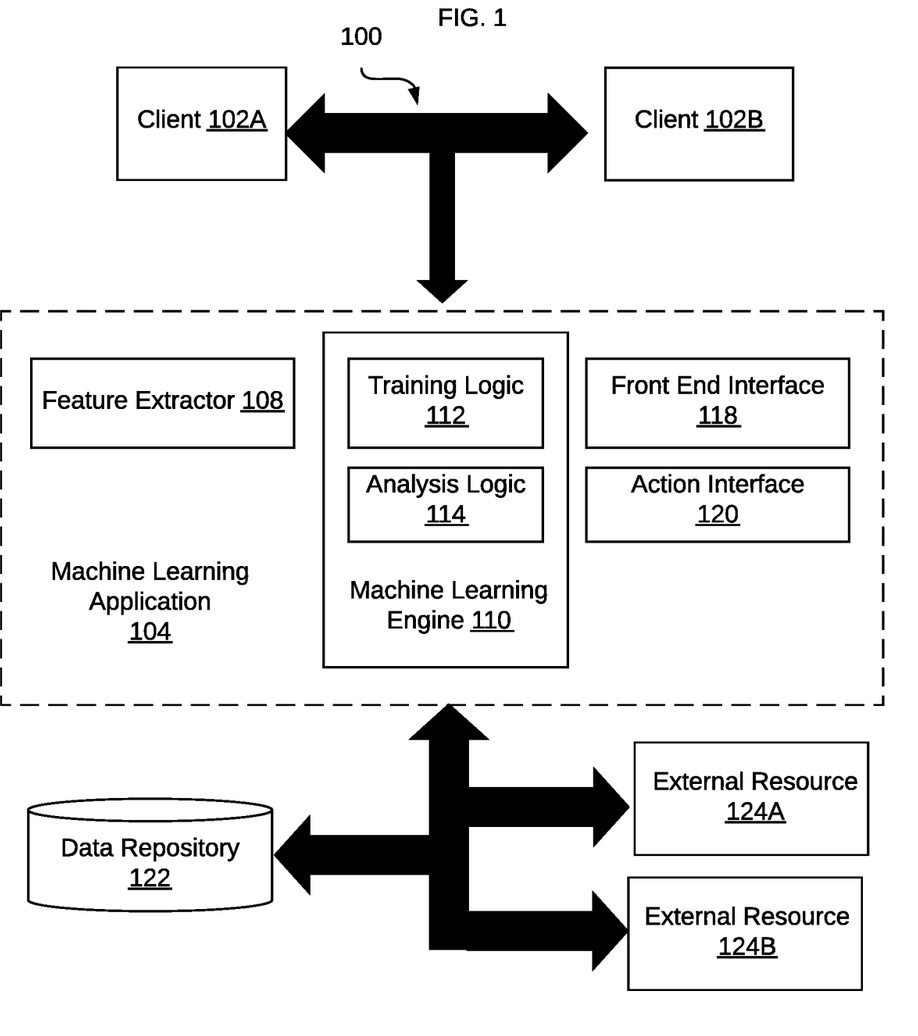
FIG. 1 illustrates a system for identifying associated events in accordance with one or more embodiments.

FIG. 1 illustrates a system 100 in accordance with one or more embodiments. As illustrated in FIG. 1, system 100 includes a machine learning system for determining a duration of a time window based on attributes of a triggering event. The system 100 then determines whether any one or more of the candidate events that occur within the time window are related to or otherwise associated with the triggering event. The system 100 includes a machine learning model, elements for training the model, and may optionally include elements for updating a training data set based on user input. In one or more embodiments, the system 100 may include more or fewer components than the components illustrated in FIG. 1.

The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, system 100 includes clients 102A, 102B, a machine learning application 104, a data repository 122, and external resources 124A, 124B.

The clients 102A, 102B may be a web browser, a mobile application, or other software application communicatively coupled to a network (e.g., via a computing device). The clients 102A, 102B may interact with other elements of the system 100 directly or via cloud services using one or more communication protocols, such as HTTP and/or other communication protocols of the Internet Protocol (IP) suite.

In some examples, one or more of the clients 102A, 102B are configured to execute events (e.g., computing system-based transactions) and transmit the events to the ML application 104 for analysis. The ML application 104 may analyze the transmitted events to determine corresponding attributes and time window durations. The ML application 104 may then analyze subsequent events to determine whether the subsequent events are associated with a triggering event, as described herein.

The clients 102A, 102B may also include a user device configured to render a graphic user interface (GUI) generated by the ML application 104. The GUI may present results of the analysis from the ML application 104 regarding events that may be related to a triggering event. Furthermore, the clients 102A, 102B may be configured to enable a user to provide user feedback via a GUI regarding the accuracy of the ML application 104 analysis. That is, a user may label, using a GUI, an analysis generated by the ML application 104 as accurate or not accurate regarding whether a triggering event and a subsequent event occurring within a time window are actually related. This feature enables a user to provide new data to the ML application 104, which may use the new data for training.

In some examples, the machine learning (ML) application 104 is configured to receive training data. Once trained, the ML application 104 may: (1) analyze attributes associated with a detected triggering event; (2) generate an analysis window having a temporal duration (a "time window") that is based on the attributes of the triggering event; and (3) analyze attributes associated with candidate events of a set of candidate events that have occurred within the time window to determine whether any of the candidate events in the set are associated with the triggering event.

Upon detecting candidate events that are related to the triggering event, the system may associate these related events together and execute a subsequent analysis on the collective set of related events. For example, the collective set of related events may be evaluated by evaluation against a set of rules or a native analysis using the ML application 104. In one example of an analysis, the system determines whether the related events are consistent with a security threat, such as repeated failed login attempts and/or repeated login attempts for different accounts from a same IP address or geolocation. In other example, the system determines whether related events are consistent with maintaining data integrity in a datastore, such as executing a first transaction and submitting a request to store a record of the first transaction in a datastore. Other similar examples are possible.

Furthermore, the ML application 104 is also configured to receive user input, via clients 102A, 102B. In some examples, the received user input verifies an analysis produced by the ML application 104 regarding a relationship between identified events. In some examples, the received user input confirms or refutes a determination by the system that analyzed events are related or unrelated. The ML application 104 may use the received user input on the analyzed events to re-train an ML engine within the ML application 104. In some embodiments, ML application 104 may be locally accessible to a user, such as a desktop or other standalone application or via clients 102A, 102B as described above.

In one or more embodiments, the machine learning application 104 refers to hardware and/or software configured to perform operations described herein for identifying related events within a time window and determining a duration of the time window based upon attributes of a triggering event. Examples of operations for these processes are described below with reference to FIGS. 2A and 2B.

The machine learning application 104 includes a feature extractor 108, a machine learning engine 110, a frontend interface 118, and an action interface 120.

The feature extractor 108 may be configured to identify attributes and corresponding values of an event and/or in data sets of events and generate corresponding feature vectors. For example, the feature extractor 108 may identify event attributes within training data and/or "target" data that a trained ML model is directed to analyze. Once identified, the feature extractor 108 may extract attribute values from one or both of training data and target data.

The feature extractor 108 may tokenize attributes (e.g., event attributes) into tokens. The feature extractor 108 may then generate feature vectors that include a sequence of values, with each value representing a different attribute token. The feature extractor 108 may use a document-to-vector (colloquially described as "doc-to-vec") model to tokenize attributes and generate feature vectors corresponding to one or both of training data and target data. The example of the doc-to-vec model is provided for illustration purposes only. Other types of models may be used for tokenizing attributes.

The feature extractor 108 may append other features to the generated feature vectors. In one example, a feature vector may be represented as $[f_1, f_2, f_3, f_4]$, where $f_1, f_2, f_3$ correspond to attribute tokens and where $f_4$ is a non-attribute feature. Example non-attribute features may include, but are not limited to, a label quantifying a weight (or weights) to assign to one or more attributes of a set of attributes described by a feature vector. In some examples, a label may indicate whether an analysis regarding a relationship between two events is correct or not correct (e.g., they are correctly identified as related, they are incorrectly identified as related, they are correctly identified as unrelated, they are incorrectly identified as unrelated).

As described above, the system may use labeled data for training, re-training, and applying its analysis to new (target) data.

The feature extractor 108 may optionally be applied to target data to generate feature vectors from target data, which may facilitate analysis of the target data.

The machine learning engine 110 further includes training logic 112, analysis logic and 114.

In some examples, the training logic 112 receives a set of electronic files as input (i.e., a training corpus or training data set). Examples of electronic files include, but are not limited to, electronic event files that include event attributes and corresponding event attribute values. In some examples, training data used by the training logic 112 to train the machine learning engine 110 includes feature vectors of event files/data objects that are generated by the feature extractor 108, described above.

A training data set may also include data associated with time durations within which related events are likely to occur. These event/time data may also be represented as feature vectors and/or as tokens within a feature vector representing a particular event. A training data set may also include one or more labels identifying an association between events. In some examples, a label in a training data set may indicate whether or not events are related to one another. A training data set may also include tokens and/or labels indicating a duration of time between related events. The system may use these data to train the machine learning engine 110 to identify not only related events but also a time duration in which to search for related events.

In some examples, training data may also include labels and/or other forms of data in which one or more triggering events are identified. That is, in some examples related events have a recognizable sequence in which a triggering or first event is followed by one or more subsequent events. The system, by identifying a triggering event, may more accurately initiate a time window in which to search for subsequent associated events that are consistent with an expected pattern of subsequent events. In other examples, events may not necessarily have a readily identifiable triggering event. In these latter cases, the system may also identify this attribute of an event and initiate a time window using techniques described below in the context of FIGS. 2A and 2B.

In some examples, events may not be definitively related to one another. Instead, events may have an ambiguous status relative to one another (e.g., sometimes they are related to one another, and sometimes they are not). The training data set may quantify a degree of ambiguity between events using a score that represents a probability of events being associated with one another. This score may, in some examples, be based on rate at which events are related to one another (e.g., in one or more training data sets, a number of times in which the events are related divided by a total number of times in which the events occur regardless of their relationship). In some examples, the machine learning engine 110 may use this probability score as one factor in determining whether or not events are related to one another.

The training logic 112 may be in communication with a user system, such as clients 102A, 102B. The clients 102A, 102B may include an interface used by a user to apply labels to the electronically stored training data set.

The machine learning (ML) engine 110 is configured to automatically learn, via the training logic 112, (a) types of events that are related to one another and (b) a time duration separating related events and/or within which related events are likely to occur. In some examples, the ML engine 110 may also automatically learn, via the training logic 112, whether an event is a triggering event (e.g., whether to expect a subsequent event) or not a triggering event. The trained ML engine 110 may be applied to target data and analyze one or more attributes of the target data. These attributes may be used according to the techniques described below in the context of FIGS. 2A and 2B.

Types of ML models that may be associated with one or both of the ML engine 110 and/or the ML application 104 include but are not limited to linear regression, logistic regression, linear discriminant analysis, classification and regression trees, naïve Bayes, k-nearest neighbors, learning vector quantization, support vector machine, bagging and random forest, boosting, backpropagation, neural networks, and/or clustering.

The analysis logic 114 applies the trained machine learning engine 110 to analyze target data, such as event data (e.g., event attributes, times, and the like). The analysis logic 114 may analyze event attributes and event attribute values for similarities to the training data.

In one example, the analysis logic 114 may identify equivalent and/or comparable attributes between one or more events and the training data. In some examples, the analysis logic 114 may include facilities for natural language processing so that comparable attributes in event data and training data may be identified regardless of differences in wording. Examples of natural language processing algorithms that the analysis logic 114 may employ include, but are not limited to, document term frequency (TF), term frequency-inverse document frequency (TF-IDF) vectors, transformed versions thereof (e.g., singular value decomposition), among others. In another example, feature vectors may also include topic model based feature vectors for latent topic modeling. Examples of topic modeling algorithms include, but are not limited to, latent Dirichlet allocation (LDA) or correlated topic modeling (CTM). It will be appreciated that other types of vectors may be used in probabilistic analyses of latent topics.

In some examples, once the analysis logic 114 identifies attributes (or a subset of attributes) in target data and corresponding attributes (or a subset) and attribute weights in training data, the analysis logic 114 determines a similarity between the target event data attributes and training data. For example, the analysis logic 114 may execute a similarity analysis (e.g., cosine similarity) that generates a score quantifying a degree of similarity between target data and training data. One or more of the attributes that form the basis of the comparison between the training data and the target data may be weighted according to the relative importance of the attribute as determined by the training logic 112. In another example, such as for a neural network-based machine learning engine 110, associations between events are not based on a similarity score but rather on a gradient descent analysis sometimes associated with the operation of neural networks.

The frontend interface 118 manages interactions between the clients 102A, 102B and the ML application 104. In one or more embodiments, frontend interface 118 refers to hardware and/or software configured to facilitate communications between a user and the clients 102A,102B and/or the machine learning application 104. In some embodiments, frontend interface 118 is a presentation tier in a multitier application. Frontend interface 118 may process requests received from clients and translate results from other application tiers into a format that may be understood or processed by the clients.

For example, one or both of the client 102A, 102B may submit requests to the ML application 104 via the frontend interface 118 to perform various functions, such as for labeling training data and/or analyzing target data. In some examples, one or both of the clients 102A, 102B may submit requests to the ML application 104 via the frontend interface 118 to view a graphic user interface of events (e.g., a triggering event, sets of candidate events, associated analysis windows). In still further examples, the frontend interface 118 may receive user input that re-orders individual interface elements.

Frontend interface 118 refers to hardware and/or software that may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 118 is specified in one or more other languages, such as Java, C, or C++.

The action interface 120 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in data repository 122 for use as a training corpus for the machine learning engine 104. It will be appreciated that the actions that are performed may vary from implementation to implementation.

In some embodiments, the machine learning application 104 may access external resources, such as cloud services. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources.

Additional embodiments and/or examples relating to computer networks are described below in Section 5, titled "Computer Networks and Cloud Networks."

Action interface 120 may process and translate inbound requests to allow for further processing by other components of the machine learning application 104. The action interface 120 may store, negotiate, and/or otherwise manage authentication information for accessing external resources. Example authentication information may include, but is not limited to, digital certificates, cryptographic keys, usernames, and passwords. Action interface 120 may include authentication information in the requests to invoke functions provided through external resources.

In one or more embodiments, a data repository 122 is any type of storage unit and/or device (e.g., a file system, database, collection of tables, or any other storage mechanism) for storing data. Further, a data repository 122 may include multiple different storage units and/or devices. The multiple different storage units and/or devices may or may not be of the same type or located at the same physical site. Further, a data repository 122 may be implemented or may execute on the same computing system as the ML application 104. Alternatively or additionally, a data repository 122 may be implemented or executed on a computing system separate from the ML application 104. A data repository 122 may be communicatively coupled to the ML application 104 via a direct connection or via a network.

Information describing events and containing event attributes, and the training data may be implemented across any of components within the system 100. However, this information may be stored in the data repository 122 for purposes of clarity and explanation.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Identifying Related Events within an Analysis Window

Figure 2A:
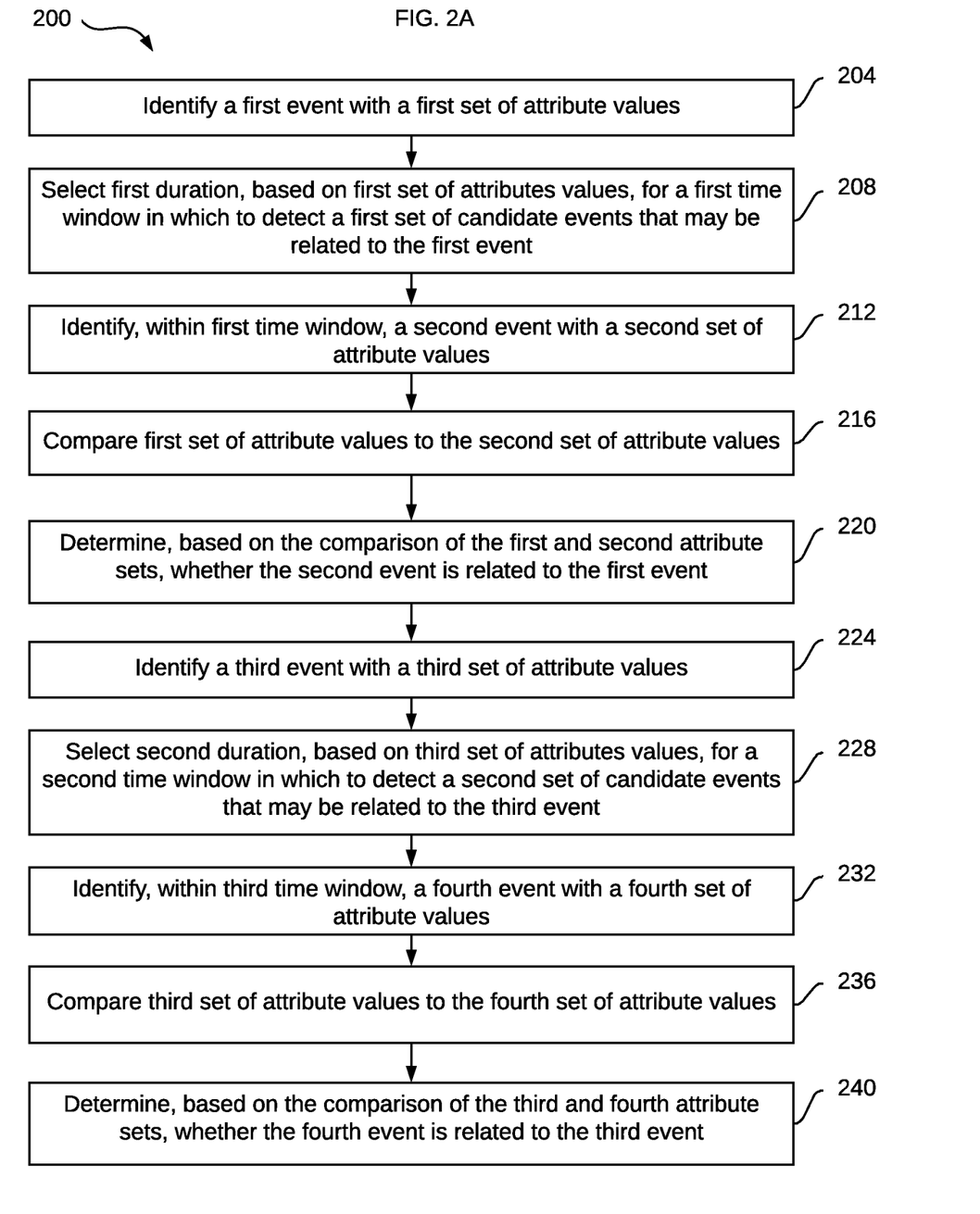
FIG. 2A schematically illustrates a technique for identifying associated events within a time window by adjusting a duration of the time window according to attributes associated with a first event in accordance with one or more embodiments.
Figure 2B:
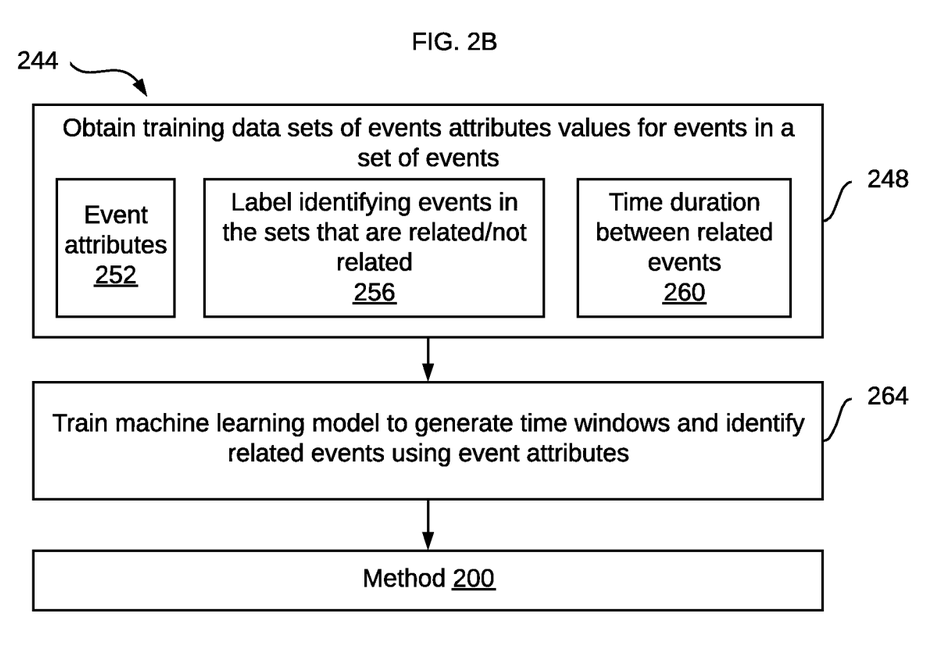
FIG. 2B schematically illustrates a technique for training a machine learning model to identify associated events within a time window in accordance with one or more embodiments.

FIG. 2A illustrates an example set of operations, referred to collectively as a method 200, for identifying events that are related to one in accordance with one or more embodiments. FIG. 2B illustrates an example set of operations, referred to collectively as a method 244, One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

Turning first to FIG. 2A, the method 200 begins by the system identifying a first event that has a first set of attributes and associated attribute values (operation 204). The system may identify the first event by monitoring one or more different types of computing transactions. In one example, the system may detect and identify events by monitoring click stream data associated with a computing device (e.g., clients 102A, 102B in the system 100). In another example, the system may monitor network traffic to and/or from a network computing device, such as a router, a switch, and/or a server. When monitoring packets transmitted through a network to identify events, the system may mirror packets using a test access point (TAP) or other type of passive monitor (e.g., a switched port analyzer (SPAN)). In some examples, the system may identify events via transaction metadata and/or using a deep packet inspection to identify events within network packet payload data.

Events that the system may identify may include user-based events such as the submission of security credentials (e.g., login attempts, paired device-based authentication, two factor authentication), resource access requests (e.g., website requests, shared network device requests (e.g., queries submitted to a server)), data storage instructions (e.g., calendar entries, file storage), data transmission instructions, requests referencing network resource identifiers (e.g., URL, network storage address, file identifier), and the like.

Other types of events that the system may identify include system and/or network based events. Specific illustrative examples of this type of system and/or network based events include bandwidth regulation events (e.g., increasing/decreasing/monitoring network capacity), data flow rates outbound and/or inbound to a domain and/or private network, server queries and/or requests, initiation and/or completion of automatic network maintenance and/or security protocols, and the like.

Attributes associated with user-based events may include user credentials, time of day, time of week, geolocation, user device identifier (e.g., media access control identifier (MAC ID)), user account identifier, and network address (e.g., internet protocol address, subnet identifier). In some examples, attributes associated with network traffic and/or network operational events may include data transmission attributes (e.g., quantity of data transmitted), types of transactions (e.g., a query, an instruction to store data, an instruction to transmit data within the network, an instructions to transmit data outside of the network), activation and/or termination of network-connected devices, and the like.

In some examples, the system may use one or more attributes to identify an event as a "triggering event." A triggering event is one in which the system recognizes that a detected event is a first or initial event in a sequence of one or more events. Recognizing that a detected event is a triggering event in a sequence of subsequent events may improve operational efficiency of the system in some examples. For example, by identifying a first event as a triggering event in a sequence of events, the system may initiate an analysis window within which to search for one or more expected subsequent events. This is in contrast to a more computationally intensive situation in which a first detected event may or may not be an initiating event. In this situation, the system may search both preceding events and monitor data for any subsequent events to determine whether the first detected event is actually related to a preceding event or is in fact a first event followed by a subsequent related event.

In one specific example illustrating the sub-analysis to determine whether the first event is a "triggering event," the system may identify engagement of a login graphic user interface as a triggering event in a sequence events. For example, the system may detect a request to access a login graphic user interface webpage by a user device having a particular MAC identifier. In this specific example, the URL of the login webpage and the MAC identifier of the device are attributes associated with this event (along with any of the other attributes identified above). The system recognizes, via these event attributes, that the event is a first event in a sequence of expected events. For example, upon identifying this triggering event, the system may anticipate the submission of login credentials, the transmission of a second factor authentication code via a separate communication channel (e.g., via a computing device and/or user account separate from those used to access the logic webpage), the submission of the second factor authentication, and the granting or denial of access. Because these events are known to occur in a defined sequence after the first, triggering event, the system need only to establish a time window and then monitor transactions for the occurrence of these expected events.

The following explanations may presume that the first event is a triggering event and therefore coincides with an origin of a generated time window for the convenience of explanation. This need not be the case, however. For example, in other embodiments, the system may identify an event, identify a duration of a time window associated with the detected event (as described below) and then apply one instantiation of the time window to a duration that precedes the event and another instantiation of the time window to the duration that follows the event. The system may then use the attributes of the event and any other detected events to determine if the detected event follows or precedes a related event.

However, as indicated above, for the sake of simplicity of explanation of the method 200, the first event and its attributes are presumed to be a triggering event. Following the identification of the first event and its associated attributes, the system selects a first duration for a first time window (or more generally an "analysis window") within which to detect a first set of candidate events that may be related to the first event (operation 208).

The system may select the first duration of the first time window based on the first set of attributes associated with the first event (operation 208). The system may select the duration based on observations in historical data that are used to train a machine learning model. For example, historical data used for training the machine learning model may indicate that upon detecting the rendering of a security credential submission page via a particular type of mobile communication device, credentials will be submitted within two minutes. In this example situation, requesting the security credential webpage corresponds to the first event and the two minutes within which credentials are expected to be submitted corresponds to the first duration of the first time window. A set of data like those presented in this example may be used by the system to train a machine learning model to identify related events and further identify correlations between one or more attributes associated with the first event and a duration of a corresponding time window within which to search for related events.

In some examples, the system may apply different weights to different attributes so that attribute values of more heavily weighted attributes contribute proportionately more to the system-selected (or equivalently, system-generated) duration of the first time window. For example, whether via a user applied weight or a weight inferred via training data, the system select the first duration disproportionately based one a subset of the first set of attribute values. In some examples, a single particular attribute may be predominately relied on (e.g., more than 50%) by the system to generate a duration of a time window. In other similar examples, the system may predominately rely on two, three, five, or less than 10 attributes to generate a duration for a time window.

In still other examples, the proportional use of attribute(s) when generating a duration of a time window is based on one or both of the attributes and/or a corresponding attribute value. For example, the system may emphasize the use of one or more attributes based on the attribute values. In one embodiment, the system may filter and thereby remove some attributes having attribute values below a threshold value for that attribute when generating a duration. The remaining attributes with values above a corresponding threshold may then be used, and optionally weighted according to the attribute and/or the attribute value, when generating a time window duration.

In still other examples, a duration may be based on a subset of the attributes, which may then be weighted according to one or both of the attribute and/or an attribute value.

Operations describing the training of a machine learning model are described in the context of FIG. 2B.

While the duration of the first time window may be measured in units of time (e.g., microseconds, seconds, minutes, hours), this need not be the case. In some examples, a duration of the first time window may be measured in units that are not time-based but instead are based on use of computing resources. In some examples, a duration of a time window may be quantified in terms of elapsed processor cycles of a central processing unit or a number of transactions executed by a computing device. In other examples, a duration of a time window may be quantified in terms of a number of packets transmitted by a computing device or through a network appliance (e.g., a switch or router). Other measurement units may also be used to specify a duration of a time window, more precisely terms as an analysis window.

In some examples, the system may select an origin of the time window to coincide with the triggering event.

Upon identifying the first duration of the first time window, the system may monitor other events occurring within the first time window to identify a second event with a second set of attribute values (operation 212).

Analogous to the first event, the second event may be associated with attributes such as device type, device identifier, time of day/week/year, geolocation, network address, transaction time, transaction type, among others.

The system then compares the first set of attributes of the first event to the second set of attributes of the second event (operation 216). The system may perform this comparison using any of a variety of techniques. For example, the first and second sets of attributes may each be vectorized (as described above) into a first event feature vector and a second event feature vector. The system may then compare the first event vector to the second event vector using a cosine similarity analysis.

In another example used to perform the operation 216, the system may compare corresponding attribute values on an attribute by attribute basis. Compared values that are within a threshold (e.g., within 10%, within a designated number of units of the attribute) may be identified as similar. In some examples, the trained machine learning model may also identify attribute values that are similar to one another based on an analysis of (optionally labeled) training data.

The system then determines, based on the comparison of the first and second attribute sets, whether the second event is related to the first event (operation 220). This determination may, as is the case with other aspects of the method 200, be accomplished using the trained machine learning model in some examples. In some examples, the first event and the second event are identified as related based on a cause-and-effect relationship. In other examples, training data may indicate that various first events and corresponding second events are related even for events that are not linked in a defined process flow. That is, training data may be used to identify related events even though those events are not in a cohesive, cause and effect sequence of events begun by an initiating event and followed by a series of subsequent events in a process flow. In fact, using a trained machine learning model to identify related events enables the system to identify related events even when the events are not clearly associated with one another. For example, a trained machine learning model may identify a particular pattern of events that are associated with a particular combination of attributes for a first event, such as a set of user credentials, a MAC ID, a time of day, and a day of week. One illustration of this is a mobile device associated with a MAC ID and a set of user credentials that accesses a first website at a particular time of week and day (e.g., a personal banking website accessed every Monday at 7 am) as a first event and subsequently placing an order for food (i.e., the second event) at a local restaurant within 3 minutes (i.e., the time window) after the first event.

In other examples, the system may determine whether the first and second event are related using other techniques (operation 220). As described above, a first event may be identified as a "triggering event" in a sequence or process flow of expected events. In this situation, the system may simply examine events in the second set of candidate events to determine if any of the candidate events in the second set have attributes that match those expected in the process flow of expected events. Returning to the login example to illustrate this scenario, the system may identify the first event as a request to access a login page. Because the system expects credentials to be submitted in a credential authorization process flow, the system may examine the subsequent events to determine if any of the subsequent events include credentials. That is, more generally, the system examines events within the second set of candidate events to determine if any of the candidate events have attributes that match with, or are similar to, attributes of events that are expected in the workflow.

The operations 204-220 may be repeated as operations 224-240 for different events. In this subsequent iteration of the operations 204-220, a duration of an analysis window for a new event is based on the attributes of that new event. This is, analogous to the operation 208, the system detects a new event and generates a time window having a duration that is based on attributes of the new event. This feature enables the system to dynamically and efficiently monitor events within time periods that are particular to an initial event in a time window.

More specifically, the system identifies a third event in click stream data, network traffic, computing device operations/transactions, or network packets (operation 224). Using the set of attributes of the third event, the system selects a second duration for a second time window within which to detect a (second) set of candidate events that may be related to the third event (operation 228). As indicated above, this second duration for the second time window is, in many cases, different from the first duration of the first time window. This is because the duration of time windows is based on the attributes associated with the event that is used by the system to initiate the analysis. In many cases, if the attributes between the first event and the third event are different, then the durations of the corresponding first time window and the second time window will be different also.

The system may detect a fourth event (within the second set of candidate events) occurring in the third time window and the associated set of fourth attribute values (operation 232). The system compares the third set of attributes associated with the third event to the fourth set of attributes associated with the fourth event (operation 236). Based on the comparison of operation 236, the system determines whether the fourth event is related to the third event.

Any of the techniques described above in the context of the operations 204-220 may be applied to perform operations 224-240.

As mentioned above, the use of a trained machine learning model may be applied to the method 200 to determine, at least in part, a duration of a time window based on event and determine whether events are related to one another. FIG. 2B illustrates an example set of operations (collectively identified as a method 244) that describe training a machine learning model.

The method 244 may begin by obtaining historical data sets used to train the machine learning model (operation 248). In some examples, the training data sets may include event data and event attribute data for sets of related and/or unrelated events (operation 252). Example attributes and event data include any of those mentioned above in the method 200. The training data sets may also include labels that identify events in a set of events as related and/or not related (operation 256). The training data sets may also include data and/or labels that identify a time duration between events within a set that are related (operation 260).

Using these data, the system then trains the machine learning model (operation 264). In this way, the system is provided with data by which to analyze target data in the form of event attributes to determine analysis window durations and related events.

Once trained, the machine learning model may be applied to target data according to the method 200.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
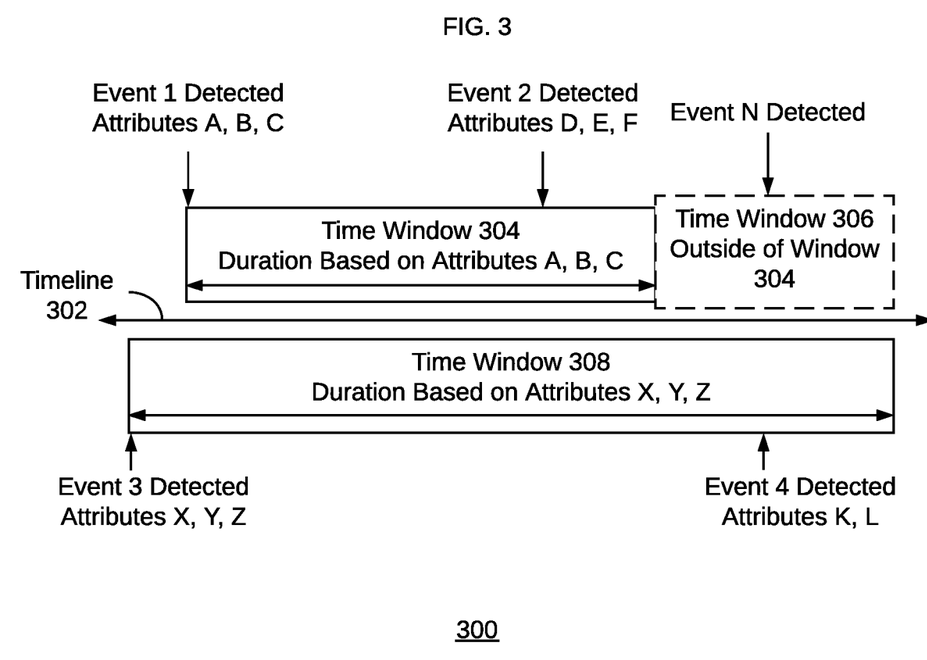
FIG. 3 schematically illustrates an example embodiment in which analysis window durations are determined based upon attributes of corresponding triggering events in accordance with one or more embodiments.

FIG. 3 schematically illustrates an example scenario 300 by which a trained machine learning model (1) analyzes events and event attributes to generate time windows having a duration based on the attributes and (2) detects related events that occur within the duration of the time window.

The scenario 300 includes a timeline 302 which is provided in FIG. 3 for convenience of comparison between the various depicted time windows.

As shown, the system detects "Event 1" and further identifies attributes "A, B, C" as associated with "Event 1." Then, applying the techniques described above, the system generates time window 304 having an origin at "Event 1," and a duration that is based on the attributes "A, B, C" and on the training of the machine learning model operated by the system to execute the methods described above.

The system detects "Event 2" with attributes "D, E, F" and "Event N." Because "Event 2" occurs within time window 304, the system compares attributes "A, B, C" of "Event 1" with attributes "D, E, F" of "Event 2." The system may then determine whether or not Event 1" and "Event 2" are related using the techniques described above. "Event N" is not analyzed for its relationship to "Event 1" because "Event N" occurs in time window 306 which is beyond the prescribed duration of the time window 304.

Time window 308 illustrates the feature of embodiments described above that durations of time windows are generated based on attributes of a corresponding first detected event. In this second scenario depicted in FIG. 3, the system detects "Event 3" and its associated attributes "X, Y, Z." The system then generates the time window 308 having an origin at "Event 3" and a duration that is based on the attributes "X, Y, Z" and on the training of the machine learning model operated by the system to execute the methods described above.

As shown, the duration of the time window 308 is greater than that of the time window 304 because of the differences between the attributes "A, B, C" (associated with "Event 1") and the attributes "X, Y, Z" (associated with "Event 3").

Furthermore, because of the longer duration of the time window 308, the system analyzes "Event 4" for its relationship to "Event 3." As shown, "Event 4" occurs at approximately a same location on the timeline 302 as "Event N." Unlike "Event N" and the time window 304, the duration of the time window 308 is sufficient to encompass "Event 4." For this reason, the system may compare attributes "X, Y, Z" of "Event 3" to the attributes "K, L" of "Event 4" to determine whether "Event 4" and "Event 3" are related. This comparison (and ultimate determination) may be performed using the method 200.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
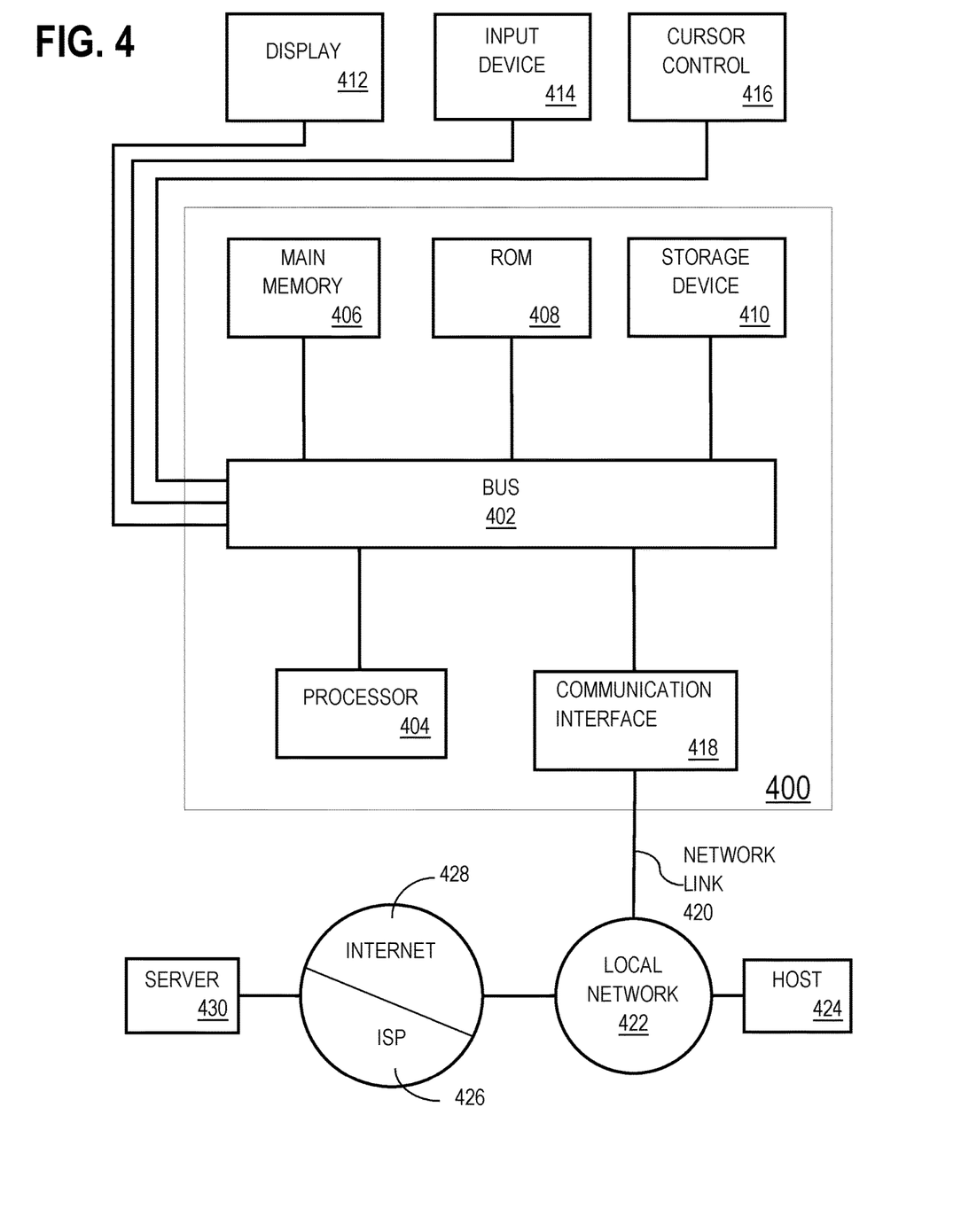
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
    monitoring, by a computer system, live packets comprising one or more of click stream data associated with one or more types of computing transactions or network traffic associated with the one or more types of computing transactions;
    identifying, by the computer system executing a deep packet inspection of the live packets, in the one or more types of computing transactions, a first event comprising a first set of attribute values;
    based on the first set of attribute values of the first event, determining, by the computer system executing the deep packet inspection, that the first event (a) is a triggering event in a set of related events of a credential authorization process flow and (b) comprises a first request to access a login page;
    responsive to determining that the first event is the triggering event:
        based on the first set of attribute values, selecting a first duration for a first time window to detect a first set of candidate events that may be related to the first event, wherein selecting the first duration for the first time window comprises applying a machine learning model to the first set of attribute values of the first event; and
        monitoring, by the computer system, the live packets comprising the one or more of click stream data or network traffic in the first time window for events in the set of related events,
            wherein the first duration for the first time window is shorter than a duration of events that would otherwise be monitored in an absence of determining that the first event is the triggering event, and
            wherein monitoring the live packets comprising the one or more of click stream data or network traffic in the first time window consumes fewer computing resources than would be consumed in an absence of determining that the first event is the triggering event;
    identifying, by the computer system executing the deep packet inspection of the live packets, within the first time window a second event comprising a second set of attribute values;
    comparing the first set of attribute values to the second set of attribute values, at least by:
        vectorizing the first set of attribute values to obtain a first event feature vector;
        vectorizing the second set of attribute values to obtain a second event feature vector; and
        determining a similarity of the first event feature vector and the second event feature vector;
    determining, based on the comparing of the first set of attribute values to the second set of attribute values, that the second event is related to the first event, wherein the second event comprises first credentials associated with the first request to access the login page in the credential authorization process flow;
    identifying, by the computer system executing the deep packet inspection of the live packets, a third event comprising a third set of attribute values, wherein the third event comprises a second request to access the login page;
    based on the third set of attribute values, selecting a second duration for a second time window to detect a second set of candidate events that may be related to the third event, wherein the second duration is different from the first duration;
    wherein selecting the second duration for the second time window comprises applying the machine learning model to the third set of attribute values of the third event;
    identifying, by the computer system executing the deep packet inspection of the live packets, within the second time window a fourth event comprising a fourth set of attribute values;
    comparing the third set of attribute values to the fourth set of attribute values; and
    determining, based on the comparing of the third set of attribute values to the fourth set of attribute values, that the fourth event is related to the third event, wherein the fourth event comprises second credentials associated with the second request to access the login page in the credential authorization process flow.

2. The medium of claim 1, wherein the operations further comprise:
   training the machine learning model to generate time windows and identify related events based on a set of attributes at least by:
      obtaining training data sets, each training data set comprising:
      attribute values for a set of events;
      time duration values between related events in the set of events; and
   training the machine learning model based on the training data sets.

3. The medium of claim 2, wherein the operations further comprise:
   generating a first prediction indicating that the first event is related to second event;
   receiving a first user input labeling the first prediction as one of correct or incorrect; and
   further training the machine learning model using the received first user input label.

4. The medium of claim 1, wherein determining that the first event and the second event are related is further responsive to determining that the first event has a causal relationship with the second event.

5. The medium of claim 1, wherein the first duration of the first time window comprises a first origin corresponding to the first event and a first terminus separated from the first origin by the first duration.

6. The medium of claim 1, wherein:
   the first set of attributes values for the first event comprises a particular attribute and a corresponding particular attribute value; and
   the first duration for the first time window is selected based on the particular attribute value of the corresponding particular attribute.

7. The medium of claim 1, wherein identifying the first event further comprises accessing transaction metadata to identify the first event within network packet payload data.

8. The medium of claim 1:
   wherein the first set of attribute values comprises one or more of: a time of day; a time of week; a geolocation; a user device identifier; a user account identifier; or a network address.

9. The medium of claim 1:
   wherein the first set of attribute values comprises one or more of: one or more data transmission attributes; a type of transaction; an activation of a network-connected device; or a termination of the network-connected device.

10. The medium of claim 1, wherein applying the machine learning model to the first set of attributes of the first event comprises:
    generating a set of tokens corresponding to the first set of attributes of the first event;
    generating a feature vector based on the set of tokens corresponding to the first set of attributes of the first event;
    applying the machine learning model to the feature vector.

11. The medium of claim 10, the operations further comprising:
    appending one or more non-attribute features to the feature vector.

12. The medium of claim 1, wherein the machine learning model comprises one or more of linear regression, logistic regression, linear discriminant analysis, classification and regression trees, naïve Bayes, k-nearest neighbors, learning vector quantization, a support vector machine, bagging and random forest, boosting, backpropagation, a neural network, or clustering.

13. A method comprising:
    monitoring, by a computer system, live packets comprising one or more of click stream data associated with one or more types of computing transactions or network traffic associated with the one or more types of computing transactions;
    identifying, by the computer system executing a deep packet inspection of the live packets, in the one or more types of computing transactions, a first event comprising a first set of attribute values;
    based on the first set of attribute values of the first event, determining, by the computer system executing the deep packet inspection, that the first event (a) is a triggering event in a set of related events of a credential authorization process flow and (b) comprises a first request to access a login page;
    responsive to determining that the first event is the triggering event:
       based on the first set of attribute values, selecting a first duration for a first time window to detect a first set of candidate events that may be related to the first event, wherein selecting the first duration for the first time window comprises applying a machine learning model to the first set of attribute values of the first event; and
       monitoring, by the computer system, the live packets comprising the one or more of click stream data or network traffic in the first time window for events in the set of related events,
          wherein the first duration for the first time window is shorter than a duration of events that would otherwise be monitored in an absence of determining that the first event is the triggering event, and
          wherein monitoring the live packets comprising the one or more of click stream data or network traffic in the first time window consumes fewer computing resources than would be consumed in an absence of determining that the first event is the triggering event;
    identifying, by the computer system executing the deep packet inspection of the live packets, within the first time window a second event comprising a second set of attribute values;
    comparing the first set of attribute values to the second set of attribute values, at least by:
       vectorizing the first set of attribute values to obtain a first event feature vector;
       vectorizing the second set of attribute values to obtain a second event feature vector; and
       determining a similarity of the first event feature vector and the second event feature vector;
    determining, based on the comparing of the first set of attribute values to the second set of attribute values, that the second event is related to the first event, wherein the second event comprises first credentials associated with the first request to access the login page in the credential authorization process flow;
    identifying, by the computer system executing the deep packet inspection of the live packets, a third event comprising a third set of attribute values, wherein the third event comprises a second request to access the login page;
based on the third set of attribute values, selecting a second duration for a second time window to detect a second set of candidate events that may be related to the third event, wherein the second duration is different from the first duration;
wherein selecting the second duration for the second time window comprises applying the machine learning model to the third set of attribute values of the third event;
identifying, by the computer system executing the deep packet inspection of the live packets, within the second time window a fourth event comprising a fourth set of attribute values;
comparing the third set of attribute values to the fourth set of attribute values; and
determining, based on the comparing the third set of attribute values to the fourth set of attribute values, that the fourth event is related to the third event, wherein the fourth event comprises second credentials associated with the second request to access the login page in the credential authorization process flow;
wherein the method is performed by at least one device including a hardware processor.

14. The method of claim 13, further comprising:
training the machine learning model to generate time windows and identify related events based on a set of attributes at least by:
obtaining training data sets, each training data set comprising:
attribute values for a set of events;
time duration values between related events in the set of events; and
training the machine learning model based on the training data sets.

15. The method of claim 14, further comprising:
generating a first prediction indicating that the first event is related to second event;
receiving a first user input label labeling the first prediction as one of correct or incorrect; and
further training the machine learning model using the received first user input label.

16. The method of claim 13, wherein determining that the first event and the second event are related is further responsive to determining that the first event has a causal relationship with the second event.

17. The method of claim 13, wherein the first duration of the first time window comprises a first origin corresponding to the first event and a first terminus separated from the first origin by the first duration.

18. The method of claim 13, wherein:
the first set of attributes values for the first event comprises a particular attribute and a corresponding particular attribute value; and
the first duration for the first time window is selected based on the particular attribute value of the particular attribute.

19. A system comprising:
one or more hardware processors;
one or more non-transitory computer-readable media; and
program instructions stored on one or more non-transitory computer readable media which, when executed by the one or more hardware processors, cause the system to perform operations comprising:
monitoring, by a computer system, live packets comprising one or more of click stream data associated with one or more types of computing transactions or network traffic associated with the one or more types of computing transactions;
identifying, by the computer system executing a deep packet inspection of the live packets, in the one or more types of computing transactions, a first event comprising a first set of attribute values;
based on the first set of attribute values of the first event, determining, by the computer system executing the deep packet inspection, that the first event (a) is a triggering event in a set of related events of a credential authorization process flow and (b) comprises a first request to access a login page;
responsive to determining that the first event is the triggering event:
based on the first set of attribute values, selecting a first duration for a first time window to detect a first set of candidate events that may be related to the first event, wherein selecting the first duration for the first time window comprises applying a machine learning model to the first set of attribute values of the first event; and
monitoring, by the computer system, the live packets comprising the one or more of click stream data or network traffic in the first time window for events in the set of related events,
wherein the first duration for the first time window is shorter than a duration of events that would otherwise be monitored in an absence of determining that the first event is the triggering event, and
wherein monitoring the live packets comprising the one or more of click stream data or network traffic in the first time window consumes fewer computing resources than would be consumed in an absence of determining that the first event is the triggering event;
identifying, by the computer system executing the deep packet inspection of the live packets, within the first time window a second event comprising a second set of attribute values;
comparing the first set of attribute values to the second set of attribute values, at least by:
vectorizing the first set of attribute values to obtain a first event feature vector;
vectorizing the second set of attribute values to obtain a second event feature vector; and
determining a similarity of the first event feature vector and the second event feature vector;
determining, based on the comparing the first set of attribute values to the second set of attribute values, that the second event is related to the first event, wherein the second event comprises first credentials associated with the first request to access the login page in the credential authorization process flow;
identifying, by the computer system executing the deep packet inspection of the live packets, a third event comprising a third set of attribute values, wherein the third event comprises a second request to access the login page;
based on the third set of attribute values, selecting a second duration for a second time window to detect a second set of candidate events that may be related to the third event, wherein the second duration is different from the first duration;

wherein selecting the second duration for the second time window comprises applying the machine learning model to the third set of attribute values of the third event;

identifying, by the computer system executing the deep packet inspection of the live packets, within the second time window a fourth event comprising a fourth set of attribute values;

comparing the third set of attribute values to the fourth set of attribute values; and determining, based on the comparing the third set of attribute values to the fourth set of attribute values, that the fourth event is related to the third event, wherein the fourth event comprises second credentials associated with the second request to access the login page in the credential authorization process flow.

* * * * *